(12) United States Patent
Dasgupta et al.

(10) Patent No.: US 11,199,491 B2
(45) Date of Patent: Dec. 14, 2021

(54) PHOTOTHERMAL ABSORBANCE MEASUREMENT IN A FLOW SYSTEM

(71) Applicant: Board of Regents, The University of Texas System, Austin, TX (US)

(72) Inventors: Purnendu Dasgupta, Arlington, TX (US); Bikash Chouhan, Austin, TX (US)

(73) Assignee: Board of Regents, the University of Texas System, Austin, TX (US)

( * ) Notice: Subject to any disclaimer, the term of this patent is extended or adjusted under 35 U.S.C. 154(b) by 0 days.

(21) Appl. No.: 16/564,465

(22) Filed: Sep. 9, 2019

(65) Prior Publication Data

US 2020/0080930 A1 Mar. 12, 2020

Related U.S. Application Data

(60) Provisional application No. 62/728,440, filed on Sep. 7, 2018.

(51) Int. Cl.
*G01N 21/17* (2006.01)
*G01K 7/22* (2006.01)
*G01K 7/02* (2021.01)

(52) U.S. Cl.
CPC .............. *G01N 21/171* (2013.01); *G01K 7/02* (2013.01); *G01K 7/22* (2013.01); *G01N 2021/1712* (2013.01); *G01N 2021/1714* (2013.01); *G01N 2201/06113* (2013.01)

(58) Field of Classification Search
CPC .... G01N 21/171; A61M 16/18; H01R 13/422
See application file for complete search history.

(56) References Cited

U.S. PATENT DOCUMENTS

| | | | | |
|---|---|---|---|---|
| 4,587,966 | A * | 5/1986 | Albarda | A61M 16/18 128/202.22 |
| 2001/0023147 | A1* | 9/2001 | Kashiyama | H01R 13/422 439/488 |
| 2002/0094580 | A1* | 7/2002 | Jorgenson | G01N 21/171 436/151 |

* cited by examiner

*Primary Examiner* — Lam S Nguyen
(74) *Attorney, Agent, or Firm* — Nexsen Pruet, PLLC

(57) ABSTRACT

A photothermal absorbance detection apparatus comprises a flow cell comprising a first temperature responsive device on an input side, a second temperature responsive device on an output side, and a detection region between the first temperature responsive device and the second temperature responsive device; and a light-emitting device positioned proximate to the detection region and configured to transmit electromagnetic radiation towards the detection region; wherein the first temperature responsive device and the second temperature responsive device together measure a change in temperature of a fluid passing through the detection region.

19 Claims, 6 Drawing Sheets

PHOTOTHERMAL ABSORBANCE MEASUREMENT IN A FLOW SYSTEM

CROSS-REFERENCE TO RELATED APPLICATIONS

This application claims priority under 35 U.S.C. § 119 to U.S. Provisional Patent Application No. 62/728,440, filed on Sep. 7, 2018, the entirety of which is incorporated by reference herein.

FIELD

The invention is generally related to photothermal absorbance devices and methods, and, more specifically, to photothermal absorbance measurements of a temperature difference in a flowing stream before and after a point of light irradiation.

BACKGROUND

Optical absorbance detection has been a long-term staple in analytical sciences for fluid-based processes. Excitation of the fluid due to light absorption is generally followed by non-radiative transition to the ground state. Thus, the absorbed light is converted to heat that manifests itself as a rise in temperature of the fluid. Photothermal absorbance measurements (PAM), especially in the liquid phase, have been broadly reviewed. The preeminent among these is the photoacoustic effect, which is the physical property used in photoacoustic spectroscopy (PAS). While PAS is often the benchmark technique to measure trace gases, liquid phase implementation is more difficult. In a flow system, flow pulsations are especially problematic. The last reported PAS detector for HPLC used a Nd:YAG laser (10 ns pulses, 0.5 mJ/pulse), and the detection mode was atypical. A Fiber Bragg Grating (FBG) was inserted into the detection cell and probed by a second laser. Detection was based on changes in the reflection spectrum of the FBG caused by the acoustic waves. The stated limit of detection (LOD) (5 µM for Coumarin 440) was attractive; however, the only chromatogram shown used 10 mM analytes.

This two-laser arrangement is quite typical in the most frequently used liquid phase PAM techniques, and has been given a number of different names, such as thermooptical deflection measurement, thermal lens calorimetry, photothermal defection spectrometry (PDS), etc. In a conventional two-laser arrangement, two laser beams, at right angles to each other, are focused on the same spot in the liquid. A "pump" beam from the first laser is from a high fluence laser operating at the analyte absorption wavelength. The local rise in temperature due to absorption of light from the pump beam, changes the refractive index (RI) of the fluid to form a thermal lens. A "probe" laser beam from the second laser is deflected by the thermal lens, and this deflection angle is measured. The difference between the deflection angle of the unheated fluid and the deflection angle of the heated fluid is calculated and an analyte concentration in the fluid is determined. Sub-femtomole limit of detection (LOD) for derivatized amino acids in a 50 µm capillary were initially demonstrated, with later experiments showing p-p noise levels of $4 \times 10^{-8}$ absorbance units (AU) and LODs of 0.1 µAU or better by photothermal deflection spectroscopy (PDS). Importantly, LODs in PDS are highly solvent dependent. Water has a high specific heat (resulting in a smaller $\Delta t$ for the same heat input). The temperature dependence of water refractive indices (RI) is also small. Some of the best reported LODs in PDS were therefore generated in non-aqueous media.

The sensitivity limitations of RI has led to exploration of viscosity, and hence electrical conductivity of a dilute salt solution (temperature dependence ~2%/° C.), as a far more sensitive approach to measuring temperature changes than via RI. Studies using a 633-nm 4 mW laser between two small wires 240 µm apart found the LOD for methylene blue (MB) in 0.05 M NaCl flowing therebetween to be 0.2 µM. However, direct illumination of electrodes dramatically raised the background signal, which was recognized as a problem. It took several decades of pursuing an "electrode-less" conductivity measurement approach, before the capacitively coupled contactless conductivity detection ($C^4D$), where electrodes are not in contact with the solution, was applied. Three ring-shaped electrodes were placed outside the measurement capillary with the excitation voltage applied to the center ring. The upstream electrode pair provided the reference measurement while the zone between the downstream electrode pair, used to detect the signal, was illuminated. Sub-µM LODs were possible for dabsyl glucosamine with 200 mW illumination @488 nm. Later work showed that $C^4D$ actually probes more than the interelectrode space, resulting in a dilution of the effect. With microfabricated Pt electrodes 50 µm apart in a microchannel (70×30 µm cross section), an LOD of 0.3 µM was possible under actual separation conditions (48 mW illumination @488 nm focused to <10 µm). More recently, polyelectrolyte gel electrodes spanning the entire channel cross section have been shown to provide better performance and an easier way to fabricate device, with this approach being used with both 2-electrode DC or 3-electrode AC configurations.

Interestingly, while all photothermal spectrometry techniques rely on measuring temperature, the actual temperature change itself is rarely directly measured. A thermistor approach has been used to measure the temperature rise of strongly absorbing solids or dye solutions upon irradiation with a 2.5 kW Xe source. Work using two thermistors has also been conducted, where the second thermistor is placed in the non-illuminated part to act as a reference and thus reduce baseline drift. It was possible to follow oxide or heptyl viologen formation, or Cu deposition on Pt/Au electrodes using this approach.

PAM has many attractive characteristics, especially for a capillary scale detection system: (a) no penalty is paid for a smaller path length L; a smaller L may result in less light absorption but a proportionally smaller liquid volume needs to be heated, (b) there are no stray light issues, spatially or with respect to wavelength, and (c) a broadband source without a monochromator can be used in an omni-wavelength chromatographic detector where any absorption in any region in will produce a response. It may seem surprising that while PAM holds much of the extant records on the low limits of absorbance measurement, there are no commercial instruments for liquid phase PAM. Except in early work (where a high power Xe lamp was used), lasers have invariably been used in PAM. The consequent marriage to a single wavelength is not particularly attractive as a general purpose detector, especially for cost reasons, if low UV is the region of interest, such as in chromatography. Moreover, neither PDS nor photothermal conductivity measurement is gradient elution compatible; a serious limitation for any chromatographer.

What is needed is an inexpensive, easy-to-construct PAM system that relies on direct thermometry, while simultaneously functioning as an omni-wavelength detector with a white LED source, or at fixed wavelengths with other inexpensive solid state sources.

SUMMARY

In an aspect described herein, a photothermal absorbance detection apparatus comprises a flow cell comprising: a first temperature responsive device on an input side, a second temperature responsive device on an output side, and a detection region between the first temperature responsive device and the second temperature responsive device; and a light-emitting device positioned proximate to the detection region and configured to transmit electromagnetic radiation towards the detection region; wherein the first temperature responsive device and the second temperature responsive device together measure a change in temperature of a fluid passing through the detection region.

In some embodiments, a flow cell described herein comprises: a fluid input tube on the input side; a fluid output tube on the output side; an input optical fiber on the input side; and an output optical fiber on the output side, wherein the input optical fiber and output optical fiber face each other, with the output optical fiber being configured to receive light emitted from the input optical fiber.

In some embodiments, the first temperature responsive device and the second temperature responsive device each individually are, or together form, a thermocouple, thermopile, thermistor, diode, or resistor. In some instances, the first temperature responsive device is a first thermocouple junction and the second temperature responsive device is a second thermocouple junction.

In some cases, the first thermocouple junction is positioned proximate to the fluid input tube; and the second thermocouple junction is positioned proximate to the fluid output tube. The fluid input tube and the fluid output tube can be made from polyetheretherketone (PEEK) in some instances.

The light-emitting device can be a broadband emitter or a fixed wavelength emitter. An exemplary broadband emitter is a white light source, such as an LED. An exemplary fixed wavelength emitter is a monochromatic laser.

The first thermocouple junction and the second thermocouple junction have a low thermal mass. In some instances, the first thermocouple junction and the second thermocouple junction comprise wires having diameters of 25 microns or less.

The first thermocouple junction and the second thermocouple junction together can comprise a thermocouple in some cases. Current can be generated by the thermocouple based on a difference in temperature between the first thermocouple junction and the second thermocouple junction. The temperature difference is created by analytes present in an analyte-containing fluid passing through the detection region of the flow cell being heated by absorption of electromagnetic radiation transmitted by the light-emitting device.

In another aspect, a method for detecting the absorbance of analytes in a fluid comprises passing an analyte-containing fluid through the flow cell of the photothermal absorbance detection apparatus described herein; measuring a temperature difference between the input side and the output side of the flow cell; and correlating the temperature difference with a concentration of analyte present in the analyte-containing fluid.

In some embodiments, methods described herein can further comprise measuring a current between the first thermocouple junction and the second thermocouple junction generated by a difference in a first temperature at the first thermocouple junction and a second temperature at the second thermocouple junction; and correlating the measured current with a concentration of analyte present in the analyte-containing fluid.

In some cases, methods described herein can further comprise irradiating the detection region with electromagnetic radiation from the light-emitting device to heat analytes present in the detection region, whereby the temperature of the analyte-containing fluid in the detection region increases as analytes in the analyte-containing fluid are heated by absorption of the electromagnetic radiation. The absorbance of the electromagnetic radiation by the analytes in the analyte-containing fluid can increase the temperature of the analyte-containing fluid passing through the detection region, resulting in the temperature of the analyte-containing fluid on the input side that is lower than a temperature on the output side.

DETAILED DESCRIPTION

Figure 1:
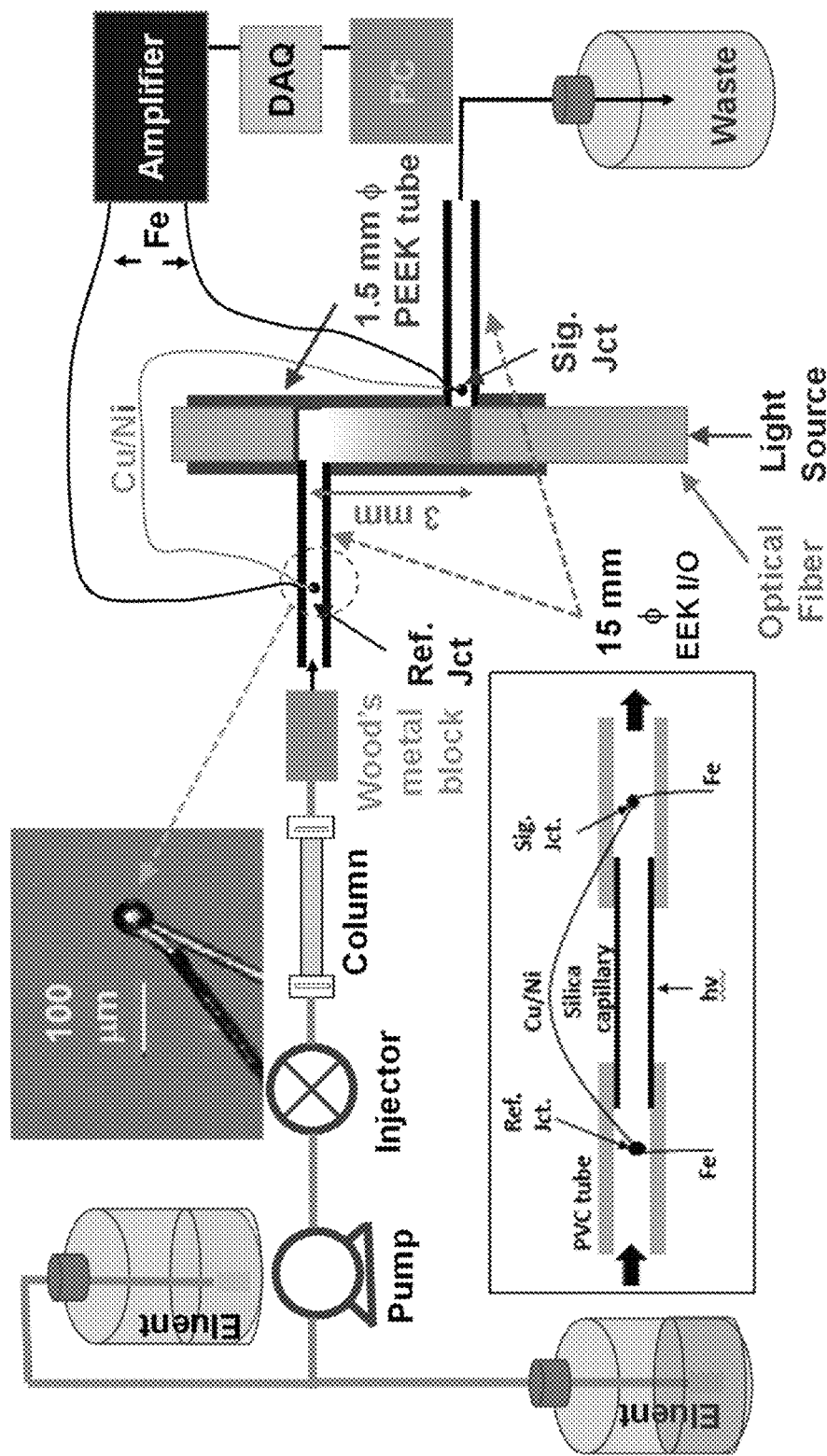
FIG. 1 illustrates HPLC system shown coupled to macroscale tube cell-based photothermal absorbance detector.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. Apparatus

In an aspect, a photothermal absorbance detection apparatus is described herein, that can determine an amount of an analyte present in an analyte-containing fluid. In some embodiments, the apparatus determines the amount of an analyte by measuring a differential temperature change of the analyte-containing fluid before and after the fluid is exposed to light. When the analyte-containing fluid is exposed to certain wavelengths of light, the analyte in the fluid absorbs the light, which results in heating the fluid, thereby causing a temperature rise in the fluid. Both inexpensive broadband/omni-wavelength and monochromatic light sources can be used, resulting in a new photothermal detection technique that can be applied to liquid chromatography.

In some embodiments, a photothermal absorbance detection apparatus comprises a flow cell and a light-emitting device. The flow cell can comprise a first temperature responsive device on an input side, a second temperature responsive device on an output side, and a detection region between the first temperature responsive device and the second temperature responsive device. In some embodiments, the flow cell can further comprise a fluid input tube on the input side; a fluid output tube on the output side; an input optical fiber on the input side; and an output optical fiber on the output side, wherein the input optical fiber and output optical fiber face each other, with the output optical fiber being configured to receive light emitted from the input optical fiber. The inset in FIG. 1 and the flow cell in FIG. 2 show exemplary embodiments of a flow cell.

The flow cell components can be made of any materials suitable for liquid chromatography and absorptive techniques. For instance, the input and output tubes can be made from polyetheretherketone (PEEK), polyvinyl chloride (PVC), polytetrafluoroethylene (PTFE), other fluorinated hydrocarbons, silica, and the like. The detection region of the flow cell can be made with any suitable light transmissive materials, such as silica, and the like.

Figure 2:
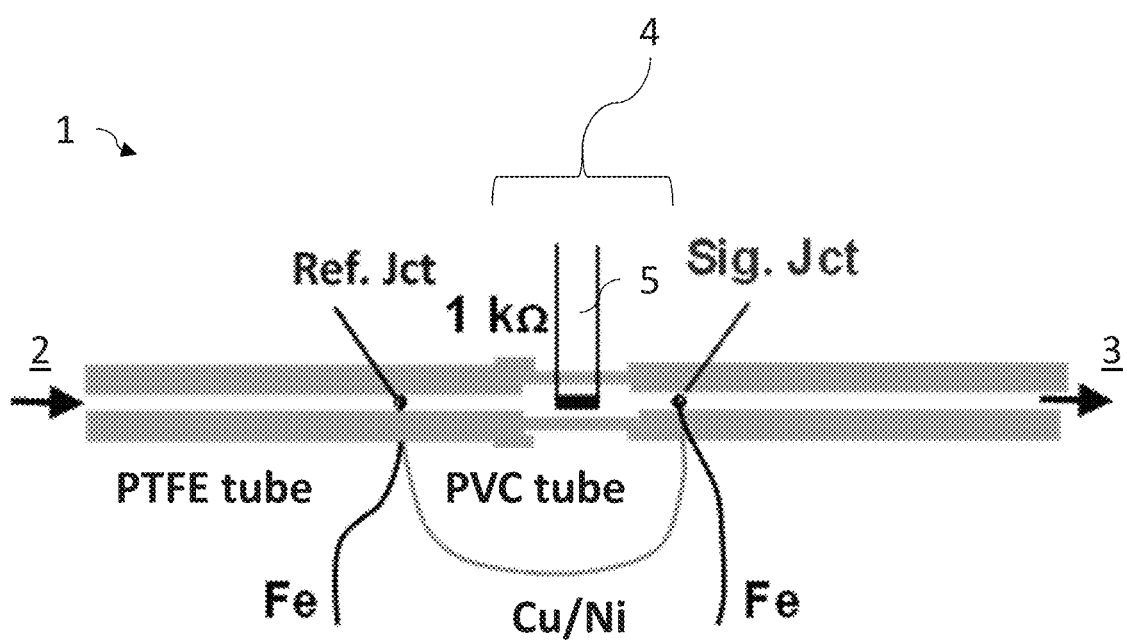
FIG. 2 illustrates the flow cell design for the thermal loss experiment.

Using FIG. 2 as an example, flow cell 1 has an input side 2, an output side 3, a detection region 4, a first temperature responsive device (Ref. Jct), and a second temperature responsive device (Sig. Jct). Particularly shown in the FIG. 2 embodiment, a heating resistor 5 is positioned in the detection region 3, although in other embodiments (such as in FIG. 1), the resistor 5 is omitted. As described in more detail below, the embodiment shown in FIG. 2 shows a first thermocouple junction as the Reference Junction (Ref. Jct) and a second thermocouple junction as the Signal Junction (Sig. Jct).

The light-emitting device is positioned proximate to the detection region and configured to transmit electromagnetic radiation towards the detection region. The light-emitting device can be a broadband emitter, such as a white light source like an LED in some cases. In other cases, the light-emitting device can be a fixed wavelength emitter, such as a monochromatic laser. The particular wavelength of the monochromatic laser can be selected based on the type of analyte being measured.

In operation, an apparatus described herein measures a change in temperature of an analyte-containing fluid after being exposed to light emitted from the light source in the detection region of the flow cell. For instance, the first temperature responsive device and the second temperature responsive device together can measure a change in temperature of a fluid passing through the detection region.

The first temperature responsive device and the second temperature responsive device can be any sensor that can measure very small changes in temperature, such as a thermocouple, thermopile, thermistor, diode, transistor, or resistor. In some embodiments, the first temperature responsive device and the second temperature responsive device each individually are, or together form a differential temperature sensor. Sensors such as thermocouples or thermopiles measure the differential temperature between the two junctions, and in some instances, individual input and output temperatures can be derived from the respective sensors. Measuring the differential temperature directly can automatically compensate for fluctuations in the temperature of the input fluid and respond only to the additional heating that occurs due to light absorption between the two sensors. This rejection of the "common mode noise" is particularly effective when the passage of the light absorbing analyte through the cell occurs at a much faster time scale than changes in the ambient temperature can affect the temperature of the input fluid.

In the embodiments shown in FIGS. 1 and 2, the first temperature responsive device is a first thermocouple junction and the second temperature responsive device is a second thermocouple junction. The first thermocouple junction is positioned proximate to the fluid input tube and serves as a reference junction (Ref. Jet). The second thermocouple junction is positioned proximate to the fluid output tube, and serves as a signal junction. Together, the first junction and the second junction forms a thermocouple device.

Since the temperature difference being measured is quite small, a thermal mass of the first and second temperature responsive devices also needs to be small to avoid thermal loss due to the devices themselves. Since the thermal mass of a thermocouple junction can be made very small, the thermocouple junction is particularly well suited. However, diodes and resistors having small form factors and correspondingly low thermal masses could equally be used. Most metals have a negative temperature coefficient of resistance, thin metal film resistors typically have a negative temperature coefficient of 0.3-0.4% per degree C. The reverse current through a diode typically increases exponentially with increasing temperature, allowing differential temperature measurements using diodes. In embodiments using a first thermocouple junction and the second thermocouple junction, wires comprising the junctions having diameters of 25 microns or less, 20 microns or less, 18 microns or less, 15 microns or less, 12 microns or less, 10 microns or less, 5 microns or less, or less than 2 microns.

When there is a temperature difference between the first thermocouple junction and the second thermocouple junction, a voltage is generated between the two thermocouple junctions that is proportional to this difference in temperature. The temperature difference is created by analytes present in an analyte-containing fluid passing through the detection region of the flow cell being heated by absorption of electromagnetic radiation transmitted by the light-emitting device

II. Methods

In another aspect, a method for detecting the absorbance of analytes in a fluid comprises passing an analyte-containing fluid through the flow cell of the photothermal absorbance detection apparatus described in Section I herein; measuring a temperature difference between the input side and the output side of the flow cell; and correlating the temperature difference with a concentration of analyte present in the analyte-containing fluid.

In some embodiments, methods described herein further comprise measuring a voltage or current between the first thermocouple junction and the second thermocouple junction generated by a difference in a first temperature at the first thermocouple junction and a second temperature at the second thermocouple junction; and correlating the measured voltage or current with a concentration of analyte present in the analyte-containing fluid.

In some instances, methods described herein further comprise irradiating the detection region with electromagnetic radiation from the light-emitting device to heat analytes present in the detection region, whereby the temperature of the analyte-containing fluid in the detection region increases as analytes in the analyte-containing fluid are heated by absorption of the electromagnetic radiation. The absorbance of the electromagnetic radiation by the analytes in the analyte-containing fluid increases the temperature of the analyte-containing fluid passing through the detection region. Thus, a temperature of the analyte-containing fluid on the input side of the flow cell, prior to passing through the detection region and absorbing energy from the light from the light source, is lower than a temperature on the output side which has been heated by the absorption of light. The rise in temperature can be correlated with the amount of analyte present in the analyte-containing fluid.

Some embodiments described herein are further illustrated in the following non-limiting examples. In the following examples, thermocouple wires were obtained from Omega; absorption spectra were measured with a Hewlett Packard 8453 UV-visible photodiode array spectrometer; LED light spectra were taken with a BWTek Exemplar Pro Peltier-cooled CCD array spectrometer; optical power was measured with a Sper Scientific model 840011 Laser Power Meter; a capacitive arc welder was made from a 5000 µF, 25V capacitor bank and charged to 7-7.5 V for microwelding; and a Keyence VHX microscope was used for photomicrography.

Example 1

HPLC System with a Photothermal Absorbance Detector

A Waters model 2690 pumping system was used with in conjunction with a Valco Instruments 10 µL manual loop injector and a Thermofischer Acclaim C18 column (RSLC 120, 2.2 µm, 2.1×100 mm). The C18 column was placed in an external column heater kept at 35° C. The chromatographic flow rate was 0.3 mL/min throughout with a 10 µL sample injected. A 500 mm length of coiled stainless steel tubing (178 µm i.d., 12.4 µL volume, put in a serpentine configuration to minimize dispersion), potted in a 50×25×20 mm block of Field's metal, was placed between the column and the detector for thermal equilibration before entering a detection cell. When a 100 µm capillary based detection cell was used, flow was split before the cell with appropriate restriction tubes to allow 100 µL/min to proceed through the detection capillary while the rest was sent to waste. The general arrangement of the HPLC is shown in FIG. 1. All data were acquired with a 2.5 V full scale Emant 300 DAQ card (22-bit @10 Hz) and processed with a 10-point rectangular kernel moving average filter with a macro written in MS Excel.

The photothermal absorbance detector was then prepared using a 3 mm path flow cell (illuminated volume ~5.4 µL) based on a 1/16/1/8 in. i.d./o.d. PEEK tube. Two 0.35 mm holes, lengthwise 3 mm apart, were drilled on opposite sides the tube; into these 2 cm lengths of 150/360 µm i.d./o.d. PEEK tubes were forcibly inserted and epoxied in place to provide liquid input/output (I/O). During the insertion of the I/O tubes, a solid 1.5 mm o.d. wire was inserted into the flow cell lumen to prevent the I/O tubes from encroaching into the lumen. Approximately 1.5 mm from the cell body, a 0.2 mm dia. hole is drilled through the wall in each of the I/O tubes for placement of thermocouple (TC) sensors. After sensor insertion, a minimum amount of epoxy adhesive is used to seal off the aperture. During drilling of the I/O tubes, some inserted member (e.g. a metal wire) is helpful to prevent drilling debris from falling into the lumen and blocking it. Two lengths of 1.5 mm dia. optical fiber, one 12 cm and other 2 cm in length with polished ends were taken and inserted through the cell termini, each reaching just up to the proximal I/O tube. The longer fiber serves to bring in light. The shorter fiber was used in two different modes: (a) a silicon photodiode (Vishay BPW34) was cemented to the distal end and the signal processed via a transimpedance amplifier to measure transmittance, and (b) as a reflector: either the distal end was silvered and then coated with a protective coating, or a reflective mylar foil was attached to the cell-end of the fiber.

Some experiments used a smaller, 100/360 µm i.d./o.d. fused silica capillary-based radially illuminated cell. The design is shown in the dashed line enclosure in FIG. 1. The junctions of the sensor are small enough to be inserted into each end of a 2 cm long capillary. The terminal end of 0.005 in. i.d. PVC pump tubing is briefly heated with a heat gun and the softened end is slipped over the silica capillary; it forms a seal when cooled. A very similar cell was also made with polymethylmethacrylate (PMMA) capillary, 25 µm bore with a ~360 µm square exterior cross section. In this case, the thermocouple junctions remained at the mouth of the capillary.

To form the thermocouple for photothermal absorbance detector, ends of iron and constantan (55% Cu, 45% Ni) thermocouple wires (25, 75, 250 µm) were twisted together and then welded by capacitive discharge (5000 µF capacitor, charged to 7.2-7.4 V) using known methods. In all cases, the respective lengths of the iron and constantan legs were ~3.5 and ~4.5 cm (measured resistances ~10 and ~50Ω, respectively for 25 µm wires). Unless otherwise stated, the results pertain to 25 µm wires, although other diameter wires could be used, so long as the wires have a very low thermal mass. The response of the thermocouple sensor, including that of the electronics was determined by enclosing everything in a controlled enclosure of known temperature to establish a baseline value and then putting one junction into a miniature container of ice. This calibration step was performed using accepted thermocouple calibration methods.

To prepare the light emitting source for the photothermal absorbance detector, a broadband/omni-wavelength light source was prepared by drilling a central hole into the transparent top of an inexpensive white LED flashlight (Ozark Trail OT-700L), and a sleeved acrylic optical fiber that fits tightly in the hole was inserted to rest in contact with the emitting area of the LED chip; this end of the fiber was thermally shaped into a ball to gather more light. A power supply was connected to the LED to power it at a constant 6 V (1.4 A). In another embodiment, an inexpensive, focusable, red laser (MTO-laser brand, 660 nm, stated power 50 mW, measured power 19 mW) was used.

Example 2

Thermal Loss in Photothermal Absorbance Detector

To ascertain heat loss to the surroundings in the photothermal absorbance detector described in EXAMPLE 1, the temperature increase was measured for known amounts of pulsed or continuous heat input as a function of water flow rate. The experiment utilized the flow cell shown in FIG. 2. A slit was made in the wall of a short segment of a 1.5 mm i.d. PVC tube and a precision thin film 1.0 kΩ resistor (dR/dT 5 ppm/° C.) was inserted through the slit and the opening sealed by epoxy. PTFE tubes, 0.25/1.6 mm i.d./o.d. were inserted at each end for liquid I/O. Holes (sealed after sensor insertion) drilled in the walls of these tubes accommodated the sensors. The measuring thermocouple was 4 mm from the resistor center. Known voltage pulses of 5 s duration (microprocessor controlled MOSFET switch) was applied to the resistor and the corresponding signal measured. Constant known voltages were applied for long durations to obtain a steady state signal.

Thermistors and thermocouples both directly translate a temperature change into an electrical output. Although thermocouples are relatively insensitive (best metallic thermocouple sensitivity ~50-60 μV/° C., present sensor 51.7 μV/C), thermocouples were used rather than thermistors. The primary criterion was size (smallest available thermistor size was 0.3 mm dia.) and hence thermal mass; a significant thermal mass of the sensor affects the measurement. A thermistor could have been used if it was available in smaller sizes. A thermocouple is self-powered as a current source and has very low input impedance as a voltage source, minimizing electromagnetically induced noise and permitting high gain. Thermocouples also uniquely provide a differential temperature measurement.

The photothermal absorbance detector is most effective when a majority of the produced heat remains in the analyte-containing fluid, rather than being lost to the walls of the flow cell under actual test conditions. Heat loss to walls was readily observed from a decrease in the signal as the signal junction (SJ) was moved further away from the illumination point (IP); however, it was noted that some separation of SJ from IP is essential to avoid light directly falling on SJ and the heating from resulting absorption. A precision resistor electrically heated by a constant voltage pulse V (2.00-9.00 V) was used to observe heat loss to walls, as shown in FIG. 2. In the embodiment shown in FIG. 2, a PVC rather than a PEEK tube was used for the convenience of inserting the resistor, however, tube i.d. was the same. The distance of SJ from the resistor was the same as the distance between SJ and the light input fiber in the macroscale cell in FIG. 1.

The input heat (J) is computed as $t_{pulse}V^2/R/$ The recovered heat in Joules was computed from the peak area (A) in a plot of time (min) vs. ΔT (in millidegrees C.) as $4.18 \times 10^{-3}$ AF ρ, where the numerical term is the conversion factor for mcal to J, F is the flow rate (mL/min) and p is the density of water. Results for experiments were conducted at four different flow rates and eight different flow rates voltages. At each flow rate, the recovered heat signal was linearly related ($r^2$ 0.9978-0.9998) to the input heat with intercepts that were statistically indistinguishable from zero. The respective slopes (equaling the fraction recovered) were 0.70, 0.77, 0.82$_5$, and 0.88 at flow rates of 0.2, 0.3, 0.4, and 0.5 mL/min. At the chromatographic flow rate of 0.3 mL/min used with the macro cell, >75% of the heat produced remains in the liquid. A plot of the fraction of the heat lost against 1/F suggests that the heat will be almost quantitatively retained by the liquid at F≥1 mL/min.

Example 3

Broadband/Omni-Wavelength Light Source in a Photothermal Absorbance Detector

The utility of using a broadband/omni-wavelength light source in the photothermal absorbance detector of EXAMPLE 1 was explored. In a traditional transmission photometry-based system, broad band signals are problematic and lack any utility, because absorption of any portion of the broadband light source would be undetectable. This is because such a signal is swamped by light from all of the unabsorbed wavelengths. However, in the photothermal absorbance detector described in EXAMPLE 1, absorption of any portion of the broadband light source by an analyte in an analyte-containing fluid would result in a thermal signal, generating a current between the first thermocouple and the second thermocouple. Under operating conditions, when read by a power meter, the power at the distal end of the coupled fiber measured 28.3 mW equivalent @ 633 nm, multiplying the LED emission matrix and the PD wavelength response matrix, the actual power was computed to be 43.8 mW. Chromatograms with this white LED source for the separation of several dyes are shown in FIGS. 3 and 4.

Figure 3:
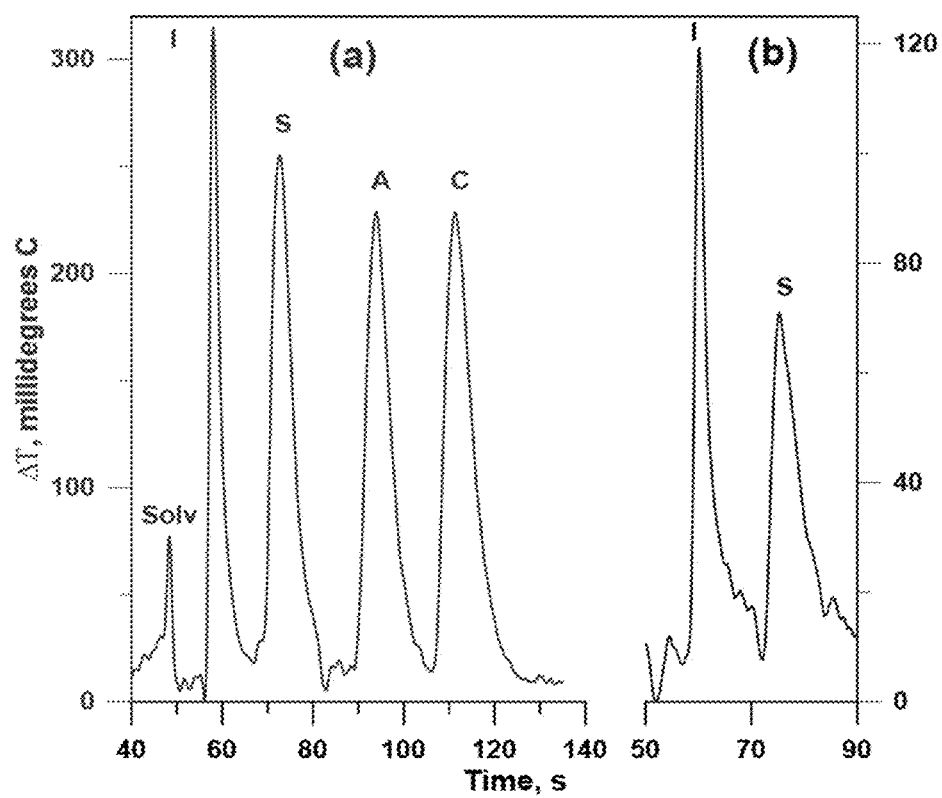
FIG. 3 shows the isocratic separation of dyes using an omni-wavelength light source.

FIG. 3 shows a graph of the isocratic separation of dyes in the system described in EXAMPLE 1 using the omniwavelength light source. Solvent A was 20 mM NH$_4$OAc and Solvent B was Methanol. In FIG. 3($a$), the flow cell had a 1.5 mm ϕ, 3 mm cell with 62% A, 38% B as eluent. Four different dyes where dissolved in the solvent mixture at a concentration of 30 μg/mL, the dyes being: Indigo carmine (I); Sunset yellow (S); Allura red (A); Chromotrope 2R (C). In FIG. 3($b$), dye concentrations of 100 μg/mL each for dyes I and S are shown, this utilized the 100 μm radial path cell.

Figure 4:
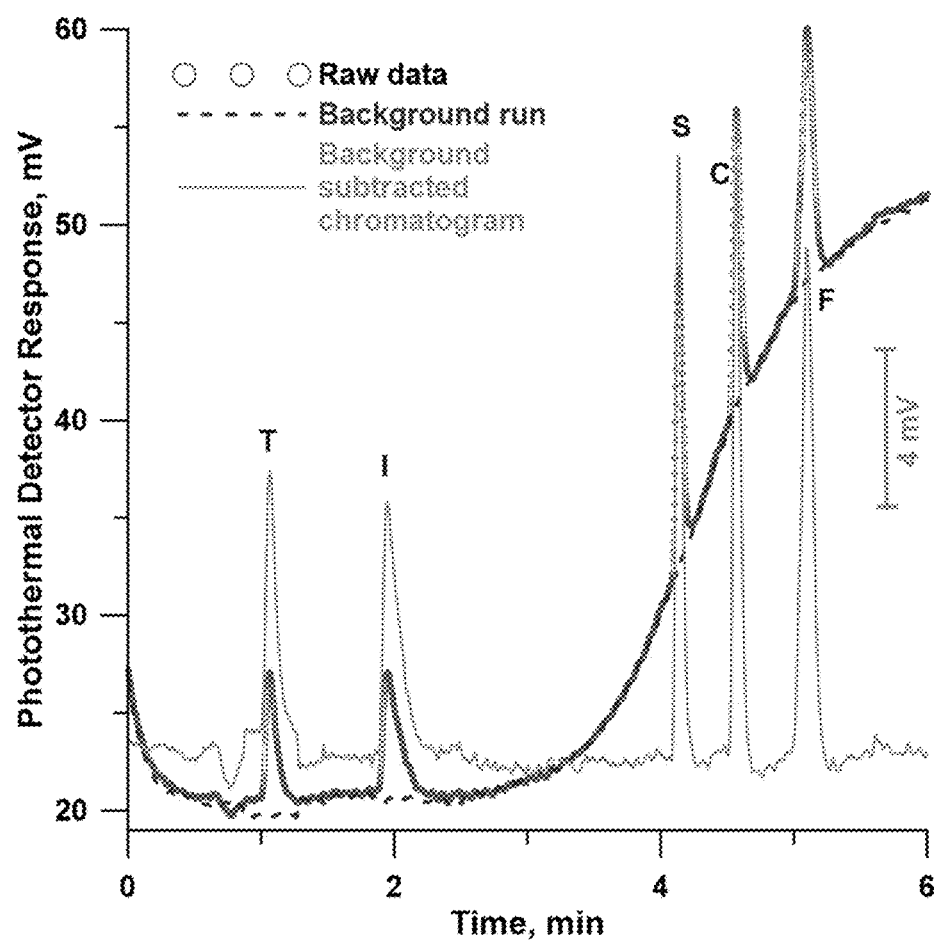
FIG. 4 shows the gradient separation of the dyes in FIG. 3.

FIG. 4 shows the gradient separation of several dyes using a solvent gradient of 85% A:15% B to 40% A:60% B, linear ramp in 1 min, dyes 100 μg/L in the 3 mm path cell of FIG. 3$a$. Aside from abbreviations already noted in the previous paragraph, Tartrazine (T) and Fast green FCF (F) are denoted as indicated.

Even for an isocratic run, unless the sample is precisely in the same solvent as the chromatographic eluent, there will be a significant initial base line disturbance. In the case of a gradient the baseline shift can be even greater. While there is some difference in solvent absorption, the large bulk of the shift is caused by the change in the specific heat of the solvent. In FIG. 4, in going from 15% to 60% methanol, the specific heat decreases by ~35°,%. The change in RI also changes the Fresnel loss at the fiber optic-liquid interface by ~20%. When the solvent refractive index more closely approaches that of the input fiber, Fresnel loss decreases, and the greater light coupling raises the baseline temperature. It will be difficult, if not impossible, to deal with this degree of RI change and measure analytes based on methods relying on the traditional approach of using ΔRI as a measurand. Conductometry will be similarly affected by solvent viscosity changes, even without considering changes in salinity.

In contrast, using the photothermal absorbance detector described in EXAMPLE 1, the present baseline rise, while not negligible, is highly reproducible to allow background subtraction. Unlike high intensity lasers focused in very small volumes, only a small portion of the broadband LED emission is absorbed by any analyte, leading to a reduction in the efficiency and sensitivity compared to high intensity lasers, but the cost of the system in EXAMPLE 1 is far less than laser-based systems. Moreover, since a macro cell was used in the system of EXAMPLE 1, full advantage of the absolute mass sensitivity was not realized as would normally be observed in the capillary scale (FIG. 3$b$ vs. 3$a$), because of difficulties in accurately splitting a very small flow and the dispersion in the described capillary cell arrangement, the linear velocity in our capillary cell was far higher than it should have been, 75× that of the macro cell.

As is well known, the photothermal signal is proportional to the absorptance, given as (1−T) where T is the transmittance. As such, if P is the total power available for absorption, the signal S would be given as, (k being the relevant absorptivity constant for the choice of the unit of concentration C):

$$S=P(1-T)==P(1-10^{-A})=P(1-10^{-kC}) \quad (Eq. 1)$$

Figure 5:
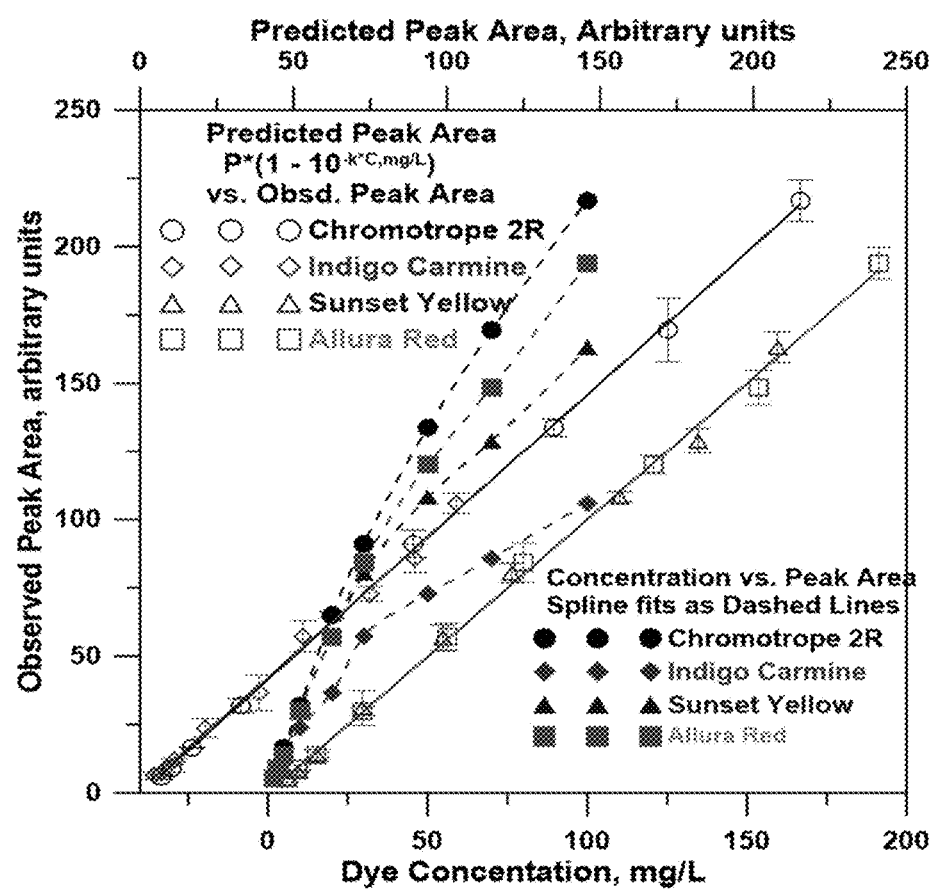
FIG. 5 shows the Peak area signal of FIG. 3 vs. concentration of various dyes.

In FIG. 5, it is readily seen that the relationship between the observed peak area and the concentration is not linear for any of the dyes (dashed lines); whereas they fit Eq. 1 with respective $r^2$ values of 0.9995, 0.9952, 0.9970, and 0.9985 for the dyes C, I, S, and A (see FIG. 3 for names), respectively the respective best fit values for P with k given in parentheses were: 334(4.49×10$^{-3}$), 120(8.44×10$^{-3}$), 200 (6.95×10$^{-3}$) and 290(4.66×10$^{-3}$). It is to be noted that as a broadband source is used with all of its output, the values of k (effective absorptivities) and P (power effectively available for absorption) are both dependent on both the source intensity distribution and analyte absorption characteristics. As such, of baseline noise cannot be specified in terms of absorbance without reference to an analyte. However, the noise can be specified in terms of temperature.

Example 4

Single Wavelength Light Source in a Photothermal Absorbance Detector

Figure 6:
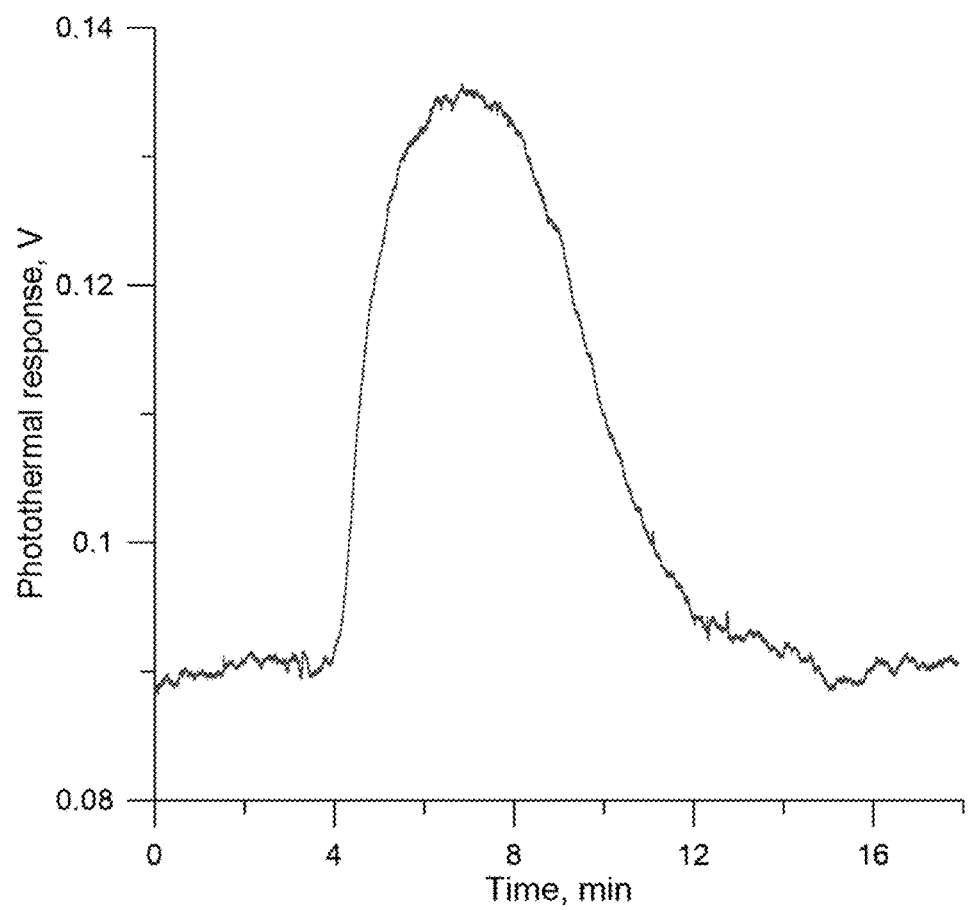
FIG. 6 shows the injection of methylene blue into a photothermal absorbance detection apparatus using a monochromatic laser light source.

Conventionally, photothermal detection studies have been conducted using high power, single-wavelength lasers focused to small spots. For this experiment, the beam quality of the low-cost (~$20) laser and its optics permitted a minimum spot diameter of ~0.25 mm. Under best case conditions, geometrical considerations suggested that the flowing analyte-containing fluid in the flow cell is exposed to no more than ~7.5 mW of the total 19 mW represented by the entire spot. The baseline standard deviation measured over a 25 s period was ~1.4 m°C., corresponding to ~8 µAU with methylene blue as the reference analyte. FIG. 6 shows the injection of 7.5 µL of 1 mg/L (3.1 µM) methylene blue into the system of EXAMPLE 1 having a flow cell with a 100 µm φ, 365 µm o.d.; flow rate 2.6 µL/min and the low cost single-wavelength laser. The large volume injection ensured that there is no dilution at the peak. As shown, a temperature gradient between the input and output sides of the flow cell produced a measurable current that can be correlated with the concentration of methylene blue present in the solution.

The fluorescence quantum efficiency of methylene blue is 0.52, so only 48% of any energy absorbed will go towards heating the surrounding solvent. This means that if all of the absorbed energy is utilized in heating the solution, the noise and detection limit could be improved by a factor of 2. The energy absorbed by 1 µg/mL methylene blue is 0.08 mW which is only ~0.4% of the total laser power. The inside channel of the silica is 100 µm and the laser spot is too large for this size, so a significant amount of power is wasted. use of a smaller laser spot size would increase the efficiency of the process.

The invention claimed is:

1. A photothermal absorbance detection apparatus comprising:
   a flow cell comprising:
      a fluid input tube and an input optical fiber on an input side;
      a fluid output tube and an output optical fiber on an output side, wherein the input optical fiber and output optical fiber face each other, with the output optical fiber being configured to receive light emitted from the input optical fiber,
      a first temperature responsive device on the input side,
      a second temperature responsive device on the output side, and
      a detection region between the first temperature responsive device and the second temperature responsive device; and
   a light-emitting device positioned proximate to the detection region of the flow cell and configured to irradiate the detection region with electromagnetic radiation;
   wherein the first temperature responsive device and the second temperature responsive device together measure a differential temperature change of a fluid passing through the detection region of the flow cell.

2. The apparatus of claim 1, wherein the first temperature responsive device and the second temperature responsive device each individually are, or together form, a differential temperature sensor comprising a thermocouple, thermopile, thermistor, diode, transistor, or resistor.

3. The apparatus of claim 1, wherein the first temperature responsive device is a first thermocouple junction and the second temperature responsive device is a second thermocouple junction.

4. The apparatus of claim 3, wherein:
   the first thermocouple junction is positioned proximate to the fluid input tube; and
   the second thermocouple junction is positioned proximate to the fluid output tube.

5. The apparatus of claim 3, wherein the first thermocouple junction and the second thermocouple junction comprise wires having diameters of 25 microns or less.

6. The apparatus of claim 3, wherein the first thermocouple junction and the second thermocouple junction together comprise a thermocouple.

7. The apparatus of claim 6, wherein current is generated by the thermocouple based on a difference in temperature between the first thermocouple junction and the second thermocouple junction.

8. The apparatus of claim 7, wherein the temperature difference is created by analytes present in an analyte-containing fluid passing through the detection region of the flow cell being heated by absorption of electromagnetic radiation transmitted by the light-emitting device.

9. The apparatus of claim 1, wherein the fluid input tube and the fluid output tube are made from polyetheretherketone (PEEK).

10. The apparatus of claim 1, wherein the light-emitting device is a broadband emitter or a fixed wavelength emitter.

11. The apparatus of claim 10, wherein the light-emitting device is a monochromatic laser.

12. A method for detecting the absorbance of analytes in a fluid comprising:
   passing an analyte-containing fluid through the flow cell of the photothermal absorbance detection apparatus of claim 1;
   measuring a temperature difference between the input side and the output side of the flow cell; and
   correlating the temperature difference with a concentration of analyte present in the analyte-containing fluid.

13. The method of claim 12, wherein the first temperature responsive device and the second temperature responsive device each individually are, or together form, a differential temperature sensor comprising a thermocouple, thermopile, thermistor, diode, transistor, or resistor.

14. The method of claim 12, wherein the first temperature responsive device is a first thermocouple junction and the second temperature responsive device is a second thermocouple junction.

15. The method of claim 14, further comprising:
measuring a current between the first thermocouple junction and the second thermocouple junction generated by a difference in a first temperature at the first thermocouple junction and a second temperature at the second thermocouple junction; and
correlating the measured current or voltage with a concentration of analyte present in the analyte-containing fluid.

16. The method of claim 15, further comprising:
irradiating the detection region with electromagnetic radiation from the light-emitting device to heat analytes present in the detection region, whereby the temperature of the analyte-containing fluid in the detection region increases as analytes in the analyte-containing fluid are heated by absorption of the electromagnetic radiation.

17. The method of claim 15, wherein each of the first thermocouple and the second thermocouple has a diameter of 25 microns or less.

18. The method of claim 15, wherein absorbance of the electromagnetic radiation by the analytes in the analyte-containing fluid increases the temperature of the analyte-containing fluid passing through the detection region,
wherein a temperature of the analyte-containing fluid on the input side is lower than a temperature on the output side.

19. The method of claim 15, wherein:
the first thermocouple junction is positioned on the fluid input tube; and
the second thermocouple junction is positioned on the fluid output tube.

* * * * *